(12) United States Patent
Alsenz

(10) Patent No.: US 6,910,971 B2
(45) Date of Patent: Jun. 28, 2005

(54) ACCELERATION SIMULATOR

(76) Inventor: Richard H. Alsenz, 205 Caruthers La., Houston, TX (US) 77024

( * ) Notice: Subject to any disclaimer, the term of this patent is extended or adjusted under 35 U.S.C. 154(b) by 0 days.

(21) Appl. No.: 10/788,828

(22) Filed: Feb. 27, 2004

(65) Prior Publication Data
US 2004/0197742 A1 Oct. 7, 2004

Related U.S. Application Data

(63) Continuation of application No. 10/004,225, filed on Nov. 2, 2001, now abandoned.

(51) Int. Cl.[7] .............................................. A63G 31/16
(52) U.S. Cl. ............................ 472/59; 472/130; 434/55
(58) Field of Search ............................ 472/59–61, 130, 472/30, 31, 47; 434/30, 34, 55

(56) References Cited

U.S. PATENT DOCUMENTS

| | | | | |
|---|---|---|---|---|
| 2,101,274 A | * | 12/1937 | Stanzel | 472/30 |
| 4,505,472 A | * | 3/1985 | Lorenc et al. | 472/39 |
| 4,898,377 A | * | 2/1990 | Roche | 472/30 |
| 5,353,242 A | * | 10/1994 | Crosbie et al. | 703/8 |
| 5,558,581 A | * | 9/1996 | Knijpstra | 472/31 |
| 5,582,518 A | * | 12/1996 | Henique et al. | 434/44 |
| 5,725,107 A | * | 3/1998 | Dembicks | 211/70.6 |
| 5,759,107 A | * | 6/1998 | Nagel | 472/47 |
| 5,846,134 A | * | 12/1998 | Latypov | 463/46 |
| 5,848,899 A | * | 12/1998 | Howard | 434/34 |
| 6,331,152 B1 | * | 12/2001 | Holle | 482/4 |

* cited by examiner

Primary Examiner—Kien Nguyen

(57) ABSTRACT

The current invention is an apparatus for and a method of producing a virtual reality effect of changing acceleration direction and magnitude by rotating a subject relative to a center axis to produce a centrifugal force, rotating the subject relative to a second axis perpendicular to centrifugal force and rotating the subject relative to a third axis perpendicular to the axis perpendicular to centrifugal force, and changing the magnitude of the centrifugal force. As a consequence the subject will perceive the acceleration upon his center of mass as changing in magnitude and angle. It is further enhanced by projecting a simulated image on a screen which is rotating in the same frame of reference as the subject.

13 Claims, 4 Drawing Sheets

ACCELERATION SIMULATOR

RELATED APPLICATIONS

This application is a continuation of U.S. patent application Ser. No. 10/004,225 filed 2 Nov. 2001 now abandoned.

BACKGROUND OF THE INVENTION

1. Field of the Invention

The invention pertains to the field of acceleration affect and effect and applies to those areas which utilize this effect for creating a human sensation of such an affect and the use of the actual effect on masses to produce varying processes in manufacturing and entertainment, product evaluation simulation such as a flight simulator, automobile, fun ride, space craft, or space station. Numerous other uses will become known for the effects and affects which are described here.

2. Description of the Related Art

The Inventor is not aware of any relevant art. The other known uses of similar principals are in the simulator used at NASA and centrifuges used in various manufacturing process. Another possible Art may be in Thrill rides such as roller costars and merry-go-rounds.

OBJECTIVES AND ADVANTAGES OF THE INVENTION

BRIEF DESCRIPTION OF THE DRAWING FIGURES

SUMMARY OF THE INVENTION

Figure 1:
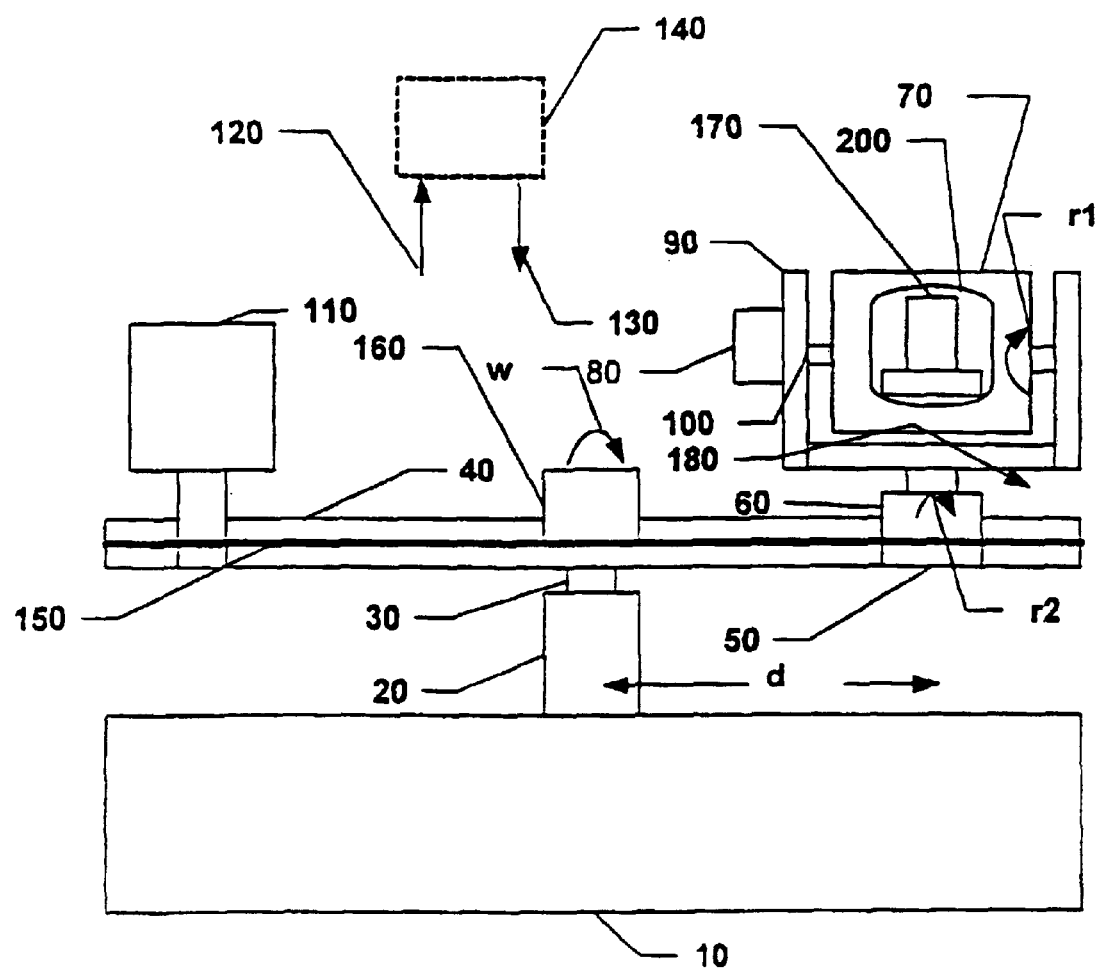
FIG. 1 is an embodiment of the invention which includes a simulated scene inside a room.

The current invention is a method of producing a virtual reality effect of changing acceleration direction and magnitude by rotating a subject relative to a center axis to produce a centrifugal force, rotating the subject relative to a second axis perpendicular to centrifugal force and rotating the subject relative to a third axis perpendicular to the axis perpendicular to centrifugal force, and changing the magnitude of the centrifugal force. As a consequence the subject will perceive the acceleration upon his center of mass as changing in magnitude and angle. It is further enhanced by projecting a simulated image on a screen which is rotating in the same frame of reference as the subject.

Elements and Functions
Table of Element and Numbers

\# Element Description a Angle made by Simulation Vector S an Z axis

A Simulation Centrifugal Acceleration Vector

A' Second Simulation Centrifugal Acceleration Vector d Distance Between Simulator Room Center of Mass and Room Counter Mass Center of Mass G Gravitational Force Vector r1 Angle of Simulator Room Rotation r2 Angle of X Axis Rotation S Simulator Acceleration Vector w1 Angular Rotation Frequency of Platform X X axis of Simulation Seat Y Y axis of Simulation Seat Z Z axis of Simulation Seat 10 Anchor Base 20 Motor 30 Motor Shaft 40 Rotating Base 50 Simulator $1^{st}$ Angular Orientation Motor 60 Simulator Room Motor Shaft 70 Simulator Room 80 Simulator $2^{nd}$ Angular Orientation Motor 90a Room Rotating Support Platform Arm 90b Room Rotating Support Platform Arm 95 Room Rotating Support Platform 100a Room Rotating Axis Arm 100b Room Rotating Axis Arm 110 Room Counter Balance Mass 120 Inputs to Computer 130 Outputs From Computer 140 Computer (micro-processor)

150 Counter Mass/Room Screw Adjust

160 Mass/Room Adjust Motor

170 Acceleration Seat

180 Net Simulator Acceleration Vector

190 Video Screen

200 Video Screen

210 Simulator room vertical extender

Table of Functions, purposes, objectives, goals, advantages, tasks

| Objective, goal, result or purpose | Solution, operation or function |
| --- | --- |
| Produce an acceleration on a mass within a room which will vary in direction. | Produce a reference frame relative to rotating frame which will rotate about 2 curvilinear coordinates |
| Produce an acceleration on a mass within a room which will vary in amplitude. | Change the angular frequency of rotating base 40 or the center of mass distance d from the center of the rotating base or the distance Change the angular frequency of the rotating frame or the distance from the center of the rotating reference frame. |
| Produce an acceleration on a mass which will vary in | Produce a reference frame relative to rotating frame which will rotate about 2 curvilinear |

-continued

Table of Functions, purposes, objectives, goals, advantages, tasks

| Objective, goal, result or purpose | Solution, operation or function |
|---|---|
| amplitude and direction. | coordinates |
| Relative to a reference object | 40 or the center of mass distance d from the center of the rotating base or the distance Change the angular frequency of the rotating frame or the distance from the center of the rotating reference frame. |
| Produce an acceleration on a mass within a room which will vary in amplitude and direction relative to the room. | |

DESCRIPTION OF THE PREFERRED EMBODIMENTS

In FIG. 1 an acceleration on a mass located in a positioning containment or a simulator room 70, such as a person setting in acceleration seat 140, is represented by net simulator acceleration vector 180, which varies in magnitude and varies in direction relative to simulator room 70. The variation in magnitude is produced as a consequence of the varying angular rotation w of the rotating base 40. The variation in direction r2 is produced by rotating simulator room support platform 90 relative to rotating base by causing simulator $1^{st}$ angular orientation motor 50. The variation in direction r1 relative to simulator room 70 is produced by causing simulator $2^{nd}$ angular orientation motor 80 to rotate simulator room 70 around room rotating axis arms 100a and 100b.

The variation in magnitude of the simulator vector can also be accomplished by varying the distance d which is distance that the simulator is from the center of rotation around platform motor 20 and the simulator room's center of mass 70. This is accomplished by room screw adjust drive 150.

Figure 2:
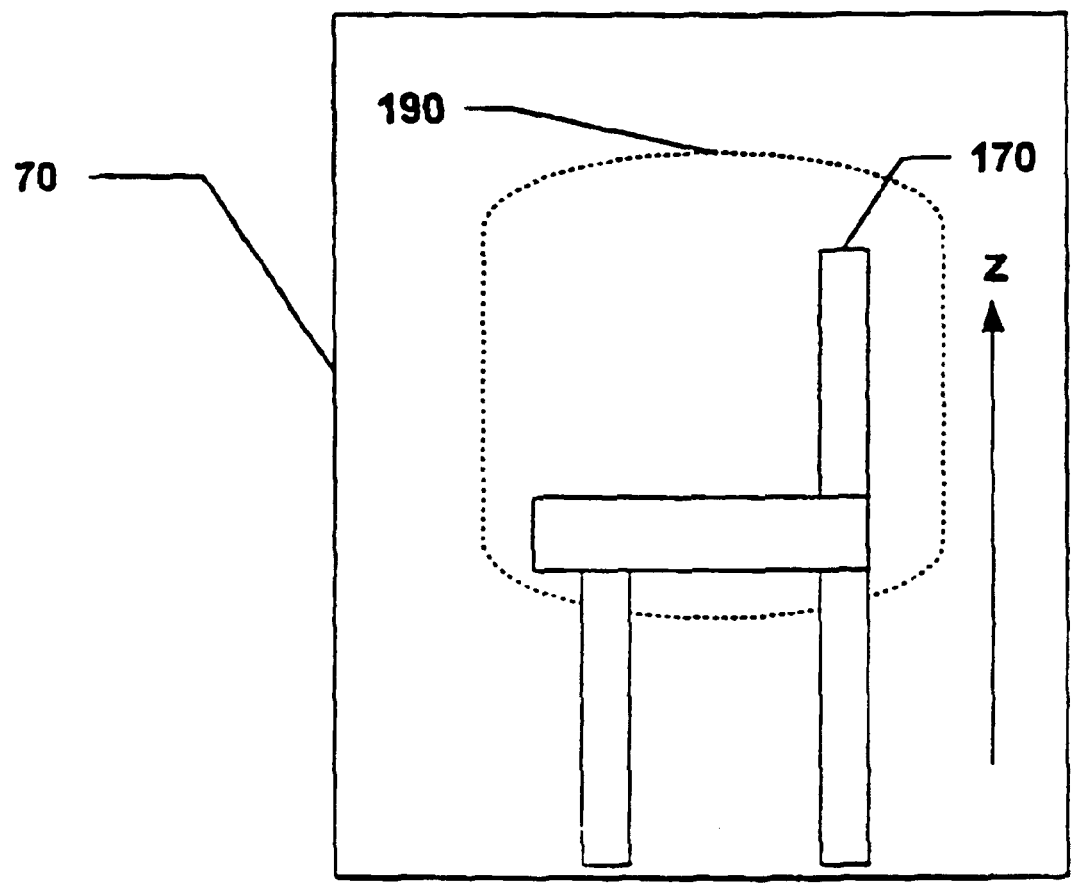
FIG. 2 is a side view of a simulator room.

In FIG. 2 an acceleration seat 170 is secured to simulator room 70. The simulation video screen 190 projects a simulated event which has an associated simulated acceleration vector S associated with it in time. The simulated event may be a prerecorded on video tape, an animated film or a computer program etc.

Figure 3:
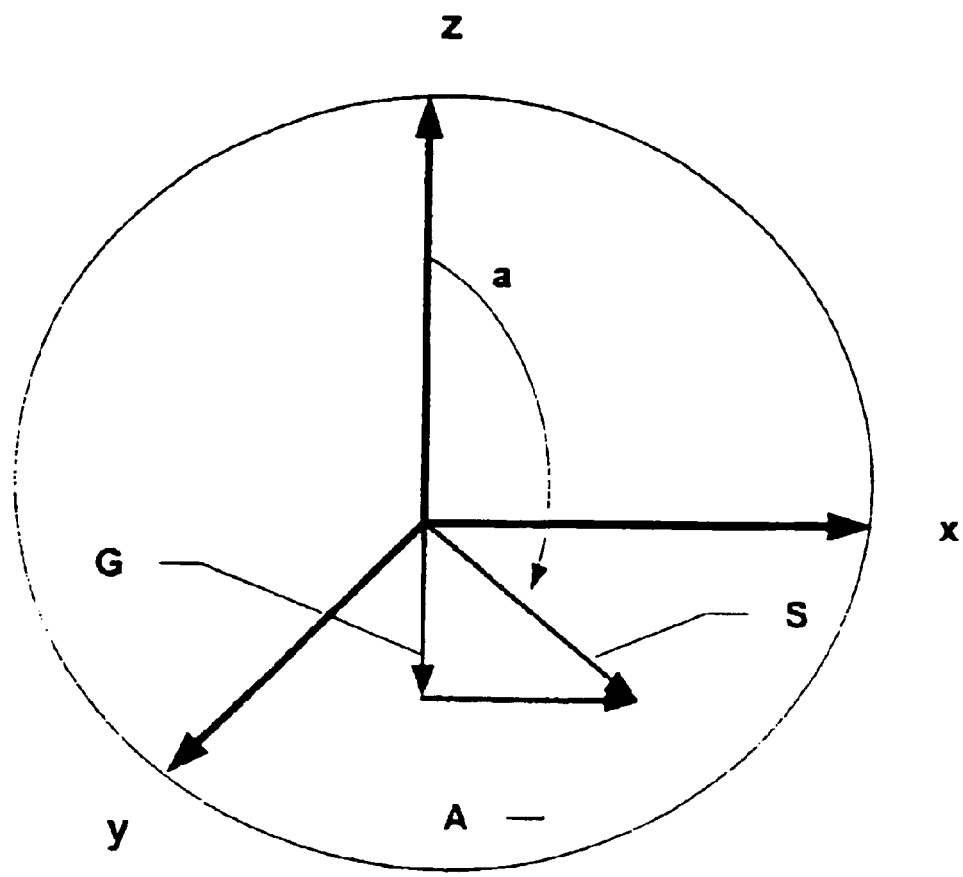
FIG. 3 is a coordinate system relative to the simulator room.

In FIG. 3 a reference frame XYZ is displayed which is rotating relative to some other reference frame. A simulated acceleration vector S is the composite of the gravitational vector G and the centrifugal force vector A i.e., S=A+G.

Figure 4:
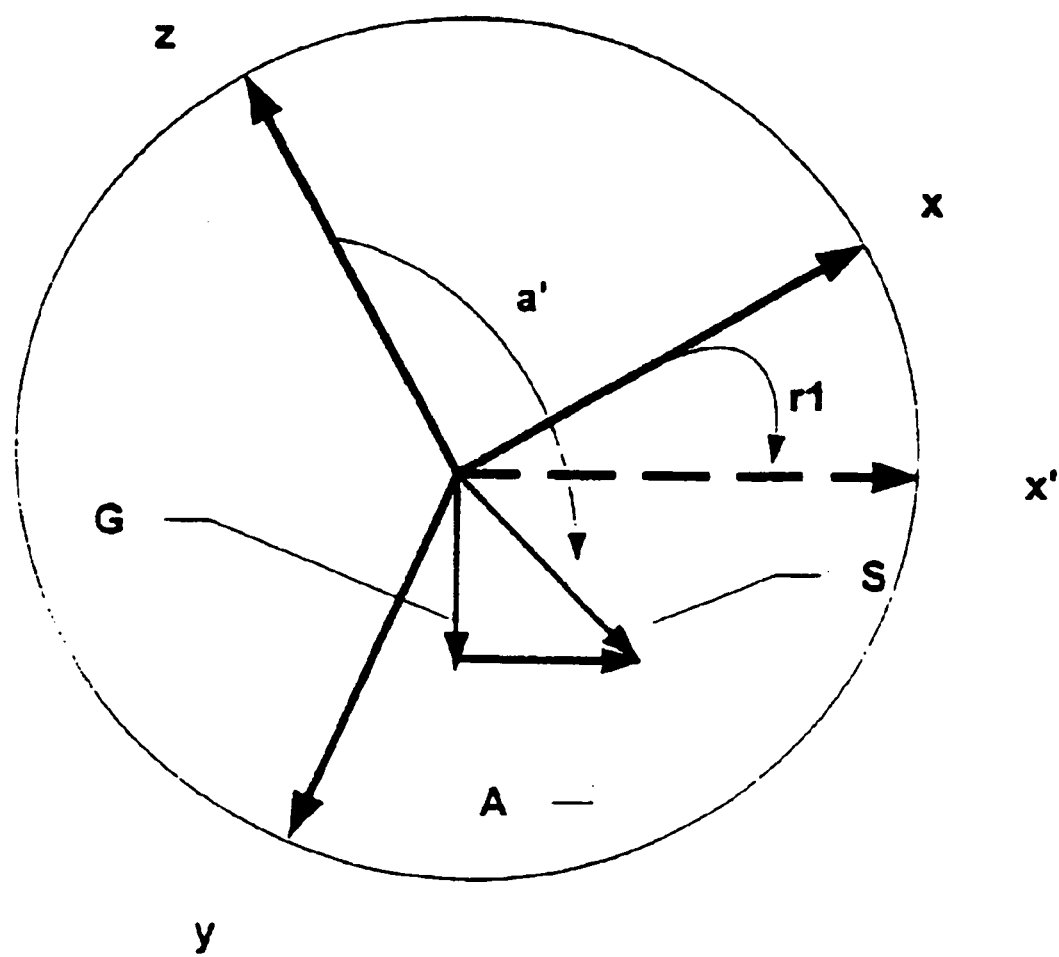
FIG. 4 is a coordinate system rotated relative to the platform.

FIG. 4 illustrates the resultant transformation S to S' if one angle of orientation is changed by angle r1, i.e., the x axis of XYZ is rotated an angle r1 about the z axis. The simulated acceleration vector appears to change directions in the frame XYZ. If a rotation is then produced by rotating an angle r2 around the Z axis of the XYZ frame then an orientation of any angle can be obtained.

Computer 140 interfaces to the motors and video screens through inputs 120 and outputs 130. A joy stick (not shown) could be interfaced to the computer through inputs 120 and an existing video game could be modified to produce an acceleration vector parameter to be used by the computer to control the simulation acceleration vector S. An acceleration sensor could be interfaced as an input device to provide feed back as to the actual acceleration produced on a mass within the simulator room.

While my above description contains many specificities, these should not be construed as limitations on the scope of the invention, but rather as an exemplification of one preferred embodiment thereof. Many other variations are possible. The scope of the invention should be determined not by the embodiment(s) illustrated, but by the appended claims and their legal equivalents.

What is claimed is:

1. A method of producing a variable acceleration vector on a mass comprising the steps of:

positioning a mass inside an simulator room;

rotating the room relative to a center axis, rotating the room relative to a second axis parallel to the center axis;

rotating the room relative to a third axis perpendicular to the second axis;

adjusting a distance between the room and the center axis;

where the three rotating steps and the adjusting step produce a desired acceleration vector on the mass within the room.

2. The method of claim 1, where the changing step includes:

changing a rate of rotation about the center axis, the second axis and/or the third axis.

3. The method of claim 1, further comprising the step of:

changing the distance between the room and the center axis.

4. The method of claim 1, where the changing step includes:

changing a rate of rotation about the center axis, the second axis, the third axis and/or the distance between the room and the center axis.

5. A method of producing a virtual reality effect comprising the step of:

positioning a person in an acceleration seat in a simulator room including at least one video screen;

displaying on the at least one video screen a simulated image;

rotating the room relative to a center axis, a second axis parallel to the center axis and a third axis perpendicular to the second axis;

adjusting a distance between the room and the center axis, where the rotating and adjusting produce an acceleration vector; and changing a magnitude and/or direction of the acceleration vector, where the image and acceleration vector are temporally associated to produce a simulated temporal event.

6. The method of claim 5, where the changing step includes:
  changing a rate of rotation about the center axis, the second axis and/or the third axis.

7. The method of claim 5, further comprising the step of:
  changing the distance between the room and the center axis.

8. The method of claim 5, where the changing step includes:
  changing a rate of rotation about the center axis, the second axis, the third axis and/or the distance between the room and the center axis.

9. A method of producing a variable acceleration vector on a mass comprising the steps of:
  creating a an acceleration vector having a magnitude and direction on a mass positioned inside a simulator room through rotation about a center axis, a second axis and a third axis, the center and second axes are parallel, while the third axis is perpendicular to the center and second axes and adjusting a distance between the room and the center axis; and
  varying the magnitude and/or direction of the acceleration vector.

10. The method of claim 9, where the changing step includes:
  changing a rate of rotation about the center axis, the second axis, the third axis and/or the distance between the room and the center axis.

11. A machine for creating a changing force direction and magnitude sensed by an object over time comprising:
  a positioning containment including an object, where the containment is mounted on a rotatable base,
  a counter balance mass mounted on the base opposite the positioning containment;
  a rotating means adapted to rotate the base, and
  an angular orientating means adapted to orient the positioning containment,
  an distance adjusting means adapted to change a distance between the positioning containing and the counter balance mass,
  where the rotating means, the angular orientating means, the adjusting means cooperate to produce a desired acceleration vector on the object and to change the acceleration vector in time.

12. A machine for creating a changing force magnitude sensed by an object over time comprising:
  a positioning containment including an object, and
  a means adapted to create an acceleration vector on the object which changes with time relative to a simulated event,
  where the means comprises:
    a rotatable base upon which the positioning containment is mounted,
    a counter balance mass mounted on the base opposite the positioning containment,
    a rotating means adapted to rotate the base;
    an angular orientating means adapted to orient the positioning containment relative to the base;
    an distance adjusting means adapted to simultaneously change a distance between a center axis of rotation of the rotating means and the positioning containment and between the center axis and the counter balance mass,
    where the rotating means, the angular orientating means and the adjusting means cooperate to produce the acceleration vector on the object.

13. A machine for creating a changing force direction and magnitude sensed by an object over time comprising:
  a rotatable base mounted on an anchor and including a rotating means adapted to rotate the base;
  a rotatable simulator room mounted on the base including an acceleration seat,
    a rotary means adapted to rotate the simulator room,
    an angular orientation means adapted to angularly orient the simulator room relative the base, and
    at least one video screen adapted to display a simulated image,
  a counter balance mass mounted on the base opposite the simulator room, and
  an distance adjusting means adapted to change a distance between a simulator room and the counter balance mass,
  where the rotating means, the rotary means, the angular orientating means and the adjusting means cooperate to produce the acceleration vector on the object and where the image and the acceleration vector varies in time relative to a simulated event.

* * * * *